June 8, 1954 H. E. BESTE 2,680,806

NOISE REDUCING SYNCHRONIZATION CIRCUIT

Filed Dec. 24, 1949 2 Sheets-Sheet 1

INVENTOR.
HAROLD E. BESTE
BY Darby & Darby
Attorneys

INVENTOR.
HAROLD E. BESTE
BY Daily & Daily
Attorneys

Patented June 8, 1954

2,680,806

UNITED STATES PATENT OFFICE 2,680,806

NOISE REDUCING SYNCHRONIZATION CIRCUIT

Harold E. Beste, Verona, N. J., assignor to Allen B. Du Mont Laboratories, Inc., Passaic, N. J., a corporation of Delaware Application December 24, 1949, Serial No. 134,892

1 Claim. (Cl. 250—27)

Figure 1:
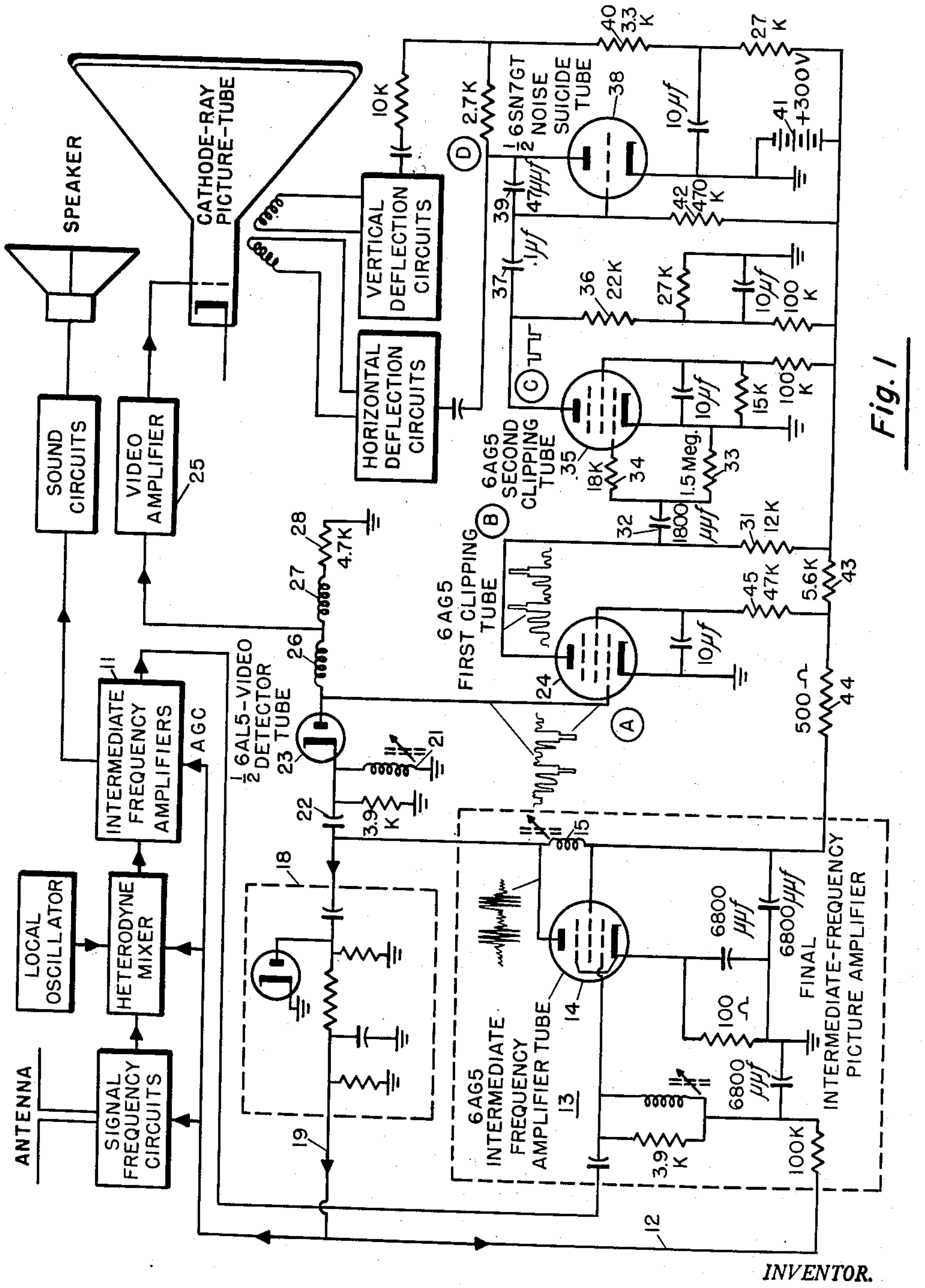

This invention relates to systems for minimizing the effects of interference on electrical waves, and more particularly to electronic apparatus and systems for improving the performance of television deflection circuits in the presence of noise interference.

Undesirable electrical impulses, commonly referred to as noise impulses are often present in television signals, interfering with synchronization. In the past, to minimize the effects of impulse type of noise upon deflection synchronization signals, noise peaks having greater amplitude excursions than synchronization signals have been clipped. Such clipping in itself, however, has not been sufficient.

An object of this invention is to provide apparatus to effectively minimize the effects of a variety of types of noise electrical impulses in television signals.

Another object is to provide apparatus in which the duration and polarity of desired synchronization signals is utilized to minimize the disturbing effect of random impulses not having a predetermined wave form.

In accordance with the invention, synchronization signals containing noise are subjected to a variety of wave shaping stages which, individually and in combination, minimize the disturbing characteristics of noise before the synchronization signals are utilized, in horizontal and vertical deflection circuits, to synchronize scanning of a received television picture.

In the drawings:

Figure 1 is a diagram, partly schematic and partly in block form, of a television receiver embodying the invention;

Figures 2, 3, 4, and 5 show the various forms of voltage waves of the receiver of Figure 1 plotted against time.

In Figure 1 a television receiver is shown in which well-known parts are indicated in block form. Amplification of picture signals comprising a carrier wave modulated with both picture and synchronization signals occurs in signal frequency amplifiers and intermediate frequency amplifiers 11. A last stage of intermediate-frequency amplification 12, indicated by a dotted block, comprises an input coupling circuit 13, which tunes with inherent circuit capacitances, a pentode amplifier tube 14 and an output inductance 15 tuning with tube and distributed capacitance.

The output of the final intermediate-frequency amplifier 12 is connected to an automatic gain control detector 18 which, with large signals from the final intermediate-frequency amplifier, generates negative voltage in the automatic gain control bias line 19. This bias line 19 provides negative grid bias to the intermediate-frequency amplifier and other stages, tending to maintain a constant level of output signal from the final intermediate-frequency amplifier for a wide range of amplitudes of input signals from the antenna.

The tuned inductance 15 is coupled to a second tuned inductance 21 by means of a coupling capacitor 22. The second inductance 21 is connected to the cathode of a video detector tube 23. The plate of the detector tube 23 is directly connected to the control grid of a first clipping tube 24. The plate of the detector tube 23 is also connected to the input of a video amplifier 25 by means of a series video inductor 26, shunt inductor 27 and a resistor 28.

The plate of the first clipping tube 24 is connected directly to a load resistor 31, and is also connected, by means of the coupling capacitor 32, to a grid leak resistor 33 and to a series resistor 34 in series with the control grid of a second clipping tube 35.

The plate of second clipping tube 35 is connected to a load resistor 36 and through a coupling capacitor 37 to the grid of a special purpose tube 38 referred to hereinafter as the noise suicide tube. The plate of the noise suicide tube 38 is connected degeneratively back to its grid by means of a feedback capacitor 39. Connected also to the plate is a load resistance 40. The grid of the noise suicide tube 38 is connected back to a source 41 of positive voltage by means of a clamping resistance 42.

In the preferred form of my invention shown, a two terminal resistance 43 is connected in series between the source of positive voltage 41 and the intermediate-frequency amplifier tube 14, forming in effect thereby a high impedance source of positive potential to which a decoupling resistor 44 for the intermediate-frequency amplifier and a screen dropping resistor 45 are attached. This portion of the circuit is described more fully in the co-pending application Serial Number 120,712, now Patent Number 2,631,230, of Clee O. Marsh, Jr.

The operation of the circuit can be seen by referring to the wave forms of Figures 2 through 5 in conjunction with the circuit of Figure 1.

Figure 2:
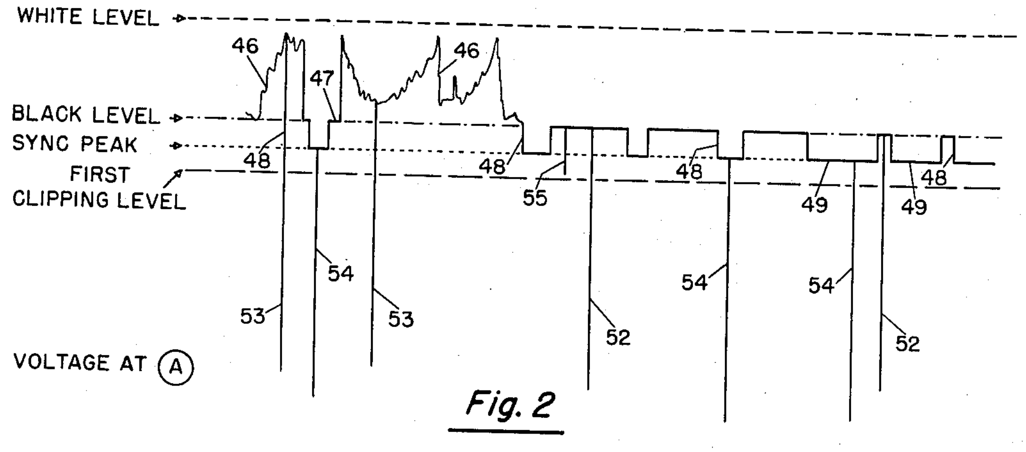
Figure 3:
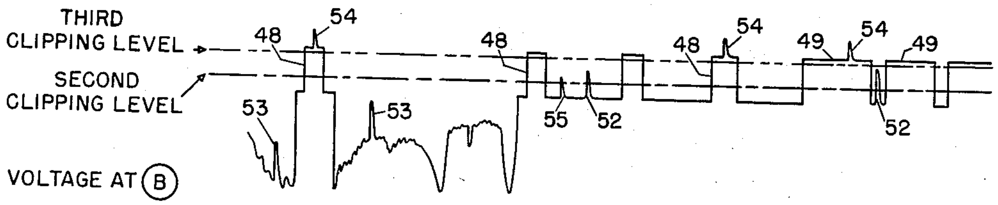

The intermediate-frequency signal, modulated with video and synchronization information, and intermixed with noise, is amplied in the amplifiers 11 and 12 and de-modulated in the detector tube 23, forming at the grid of the first clipping tube 24 a combined video and synchronization signal shown in Figure 2 and identified in Figure 1 by the letter A. The wave of Figure 2 is a simplified wave, showing video signals 46, retrace or blanking signals 47, horizontal synchronizing signals 48, and vertical synchronizing signals 49, it being understood that the actual wave occupies a far greater time dimension than can be readily portrayed, and that a portrayal of the effect of the described circuit upon noise in the simplified wave will fully and clearly illustrate the operation of the invention upon noise in the actual wave.

For illustrative purposes, noise signals 52, 53, 54 and 55 are shown disposed in various parts of the desired signal. These signals are large in comparison with the desired signals and are of short duration, these being characteristic of impulse-type noise such as are generated by ignition system, such as commonly cause disruption of television reception.

The signal A, with the synchronization signals extending in a negative direction, is fed into the grid of the first clipping tube 24, the cutoff voltage of this tube being controlled as described in the above identified co-pending application so that clipping of the large noise pulses 52, 53 and 54 occurs, a smaller noise pulse 55 remaining unclipped.

The controlling of this clipping level is accomplished in part by the action of automatic gain control and in part by the resistor 43. Large variations in signals received at the antenna are acted upon by the automatic gain control circuit so that only small variations of signal strength occur at the point A. Even though small, these variations are nevertheless sufficient to cause inefficiency of clipping here unless the clipping level were made variable, automatically controlled by the size of the signal. The direct current in the intermediate-frequency amplifier 14 flows through the resistor 43 causing a drop therein proportionate to the amount of current flowing through the amplifier 14. A large signal input at the antenna causes a large signal input at the automatic gain control detector which causes negative bias to be generated reducing the gain of the controlled amplifier stages in a well known manner. However, in reducing the gain of the controlled amplifiers, the current through the resistor 43 is reduced, thus raising the screen voltage of the first clipper tube 24. Conversely a lower voltage at A is accompanied by a lower screen voltage. Since the control grid of this tube 24 is direct-coupled to the anode of the detector tube, only negative voltages occur at the grid, zero voltage being represented by the white level line. The negative cutoff of the first clipper tube 24 under these conditions is determined by the positive voltage on the screen of this tube, and this, as has been shown, varies in accordance with the size of the signal A. As a result of the above, the noise clipping level varies in accordance with the size of the signal, resulting in very efficient clipping for all possible levels of received signal.

Although Figure 1 shows only a single amplifier stage having its direct or "B" current flowing through the resistor 43, it will be obvious that any number of amplification stages to which automatic gain control is applied may be utilized to provide a voltage drop through the resistor 43. Similarly, although the screen grid of the first clipper tube 24, is shown connected to the resistor 43, it will be apparent that any positive element or anode within a tube governing its cutoff or clipping level may be utilized.

Since the signal A is essentially that producing video signals it requires amplification in a wide-band amplifier. The amplifiers preceding the first clipper are therefore wide band. This condition is useful in the minimization of noise in the synchronization circuits, since there is no broadening of noise pulses prior to the first noise clipping. In the plate circuit of the first clipper tube 24, the voltage of Figure 3 appears, this voltage being identified in Figure 1 by the letter B. The load resistor 31 is made larger than a value which would accommodate the video signals, resulting in a narrow band load impedance. Of the portions of the voltage wave A which have not been removed by clipping, therefore, only lower frequency components are amplified by the first clipper tube 24. In passing through this narrow band, short duration pulses such as those shown are reduced in amplitude and broadened in time duration in proportion to the reduction of band width. It has been found that although appreciable improvement in impulse noise rejection occurs if the bandwidth of this stage is reduced to one-half that of the video stage, approximately 2 megacycles for a 4 megacycle video signal, optimum noise reduction is obtained from a bandwidth of approximately 300 kilocycles, which is about one-thirteenth that of the video band.

The voltage wave B, having the synchronization signals extending in a positive direction from the video signals, is coupled to the grid of a second clipping tube 35. The constants of this circuit are chosen so that negative clipping of the signal occurs as shown in the synchronization signal, so that portions of the wave more negative than this, including the video signal, are removed. In addition, use of the series resistor 34, which is considerably higher in impedance than the input of the second clipper tube 35, insures clipping of the positive portions of the circuit, and reduction of noise impulses which occur in this region. The input circuit of the second clipper tube is therefore a double clipper, both clipping levels occurring at the level of the synchronization portions of the signals, so that both positive and negative extremities of the signal are removed.

Figure 4:
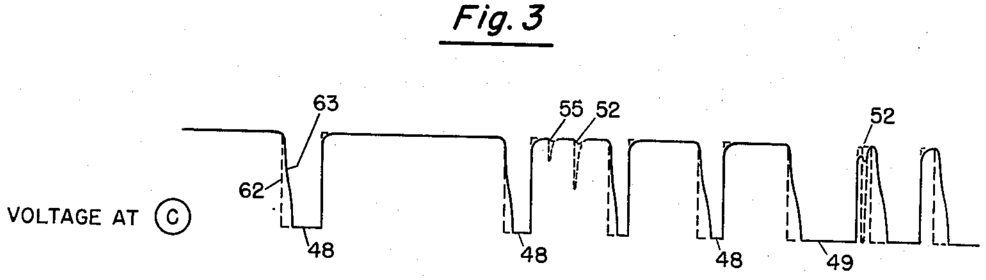

The voltage C appearing at the plate of the second clipping tube 35 and shown by the solid line of Figure 4, results in part from the current flowing through the tube and part from the nature of the plate load. Since the plate load is dynamic, changing with the instantaneous value of the applied voltage, due to the action of the noise suicide tube 38, the explanation is simplified by the use of dotted lines 62 in this figure, representing the voltage which would occur if the load of the second clipper tube were not dynamic.

As may be seen, the dotted lines represent the signal which would result in first clipping the noise peaks in the wide band signal, then passing through a narrow band filter, then double clipping. The noise peaks 53, which occur during the video signal, have been completely eliminated with the removal of the video signal by negative clipping of the second clipping tube. Also the noise peaks 54, which occurred during the synchronizing signals, have been completely eliminated in the positive clipping of the second clipping tube in conjunction wtih the resistor 34. Thus two types of signals 53 and 54 are completely eliminated, leaving a third type 52 and 55 which type occurs during the portions of the picture which are blanked out or nearly black. The effect of this noise signal can be greatly reduced by the dynamic action of the noise suicide tube 38.

This thermionic tube 38 is biased so that it is normally conductive in the absence of incoming signals, the resistor 42 clamping the grid of this tube to zero bias. When signals are applied this clamping action causes the most positive portions of the incoming signal to be maintained at zero bias, other portions of the signal being consequently more negative. When the tube is conductive, in its normal operating condition, the normal grid-plate capacitance of the tube, supplemented by the capacitance 39, causes the effective capacitance of the input circuit to increase in proportion to the low frequency gain of the tube. In its normal operating condition, therefore, small, short, or random noise currents, flowing in the plate circuit of the second clipper tube, operate into a large capacitive load which tends to minimize voltage fluctuations, as shown by the solid lines at points 52 and 54 of this figure. When a synchronizing pulse occurs, as shown at 63 of Figure 4, a persistent negative signal is applied to the input circuit of the noise suicide tube tending to render it less conductive. As the tube becomes less conductive, the effective input capacitance diminishes, so that the major portion of the sync pulse operates into a load having low effective input capacitance. Thus it is seen that sync pulses have to overcome a certain threshold of capacitive loading, which threshold having been overcome, the load is non-capacitive permitting sharp, clean synchronizing pulses less susceptible to interlace variations in the presence of noise than pulses having a gradual slope.

Figure 5:
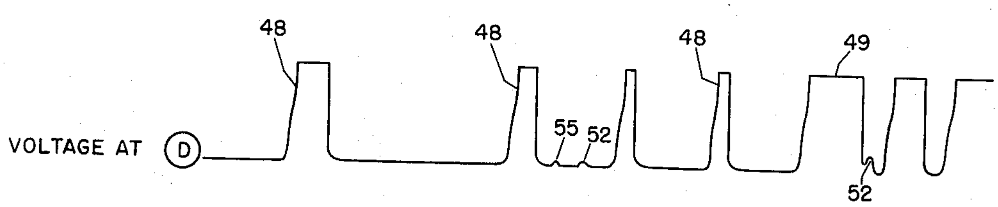

Sync pulses having a polarity and amplitude suitable for the direct operation of the horizontal and vertical sweep oscillators are obtained from the plate of the noise suicide tube 38, as shown in Figure 5.

In its basic form, the noise suicide tube consists of a unilateral non-linear amplifying element having input and output circuits, a degenerative feedback path between input and output circuits, the coupling between these circuits being more degenerative to high than to low frequencies, the amplifier being non-linear and biased to be in its most highly amplifying condition. Short, small and random fluctuations introduced into the input circuit face a highly degenerative condition of the amplifier tending to minimize variations. Long, large, persistent pulses applied in the direction which tends to lessen the amplification of the amplifier, overcome a threshold condition wherein the degenerative condition lessens, so that latter portions of the desired pulse are stretched and sharpened.

It has been shown that in accordance with my invention a variety of noise-reducing steps are applied successively and in combination to synchronization signals. For the purpose of description of a particular stage of noise reduction, preceding stages can be considered to be a source of synchronizing signals, and successive stages can be considered to be a utilization circuit for synchronization signals.

Although specific embodiments have been shown and described, the scope of the invention is defined in the following claim.

What is claimed is:

A device for minimizing undesired signals in the presence of desired unidirectional signals, comprising a thermionic tube having a cathode, a grid, and a plate, a source of positive voltage connected to said grid through resistance, an input circuit connected between said grid and said cathode so that said desired signals are applied negatively to said grid, a resistance and a source of positive potential connected in series between said cathode and said plate, and a capacitance connected directly between said grid and said plate degeneratively coupling said plate to said grid at frequencies higher than the fundamental frequency of said desired signals.

References Cited in the file of this patent

UNITED STATES PATENTS

| Number | Name | Date |
|---|---|---|
| 1,443,011 | De Bellescize | Jan. 23, 1923 |
| 1,681,788 | Ruckel | Aug. 21, 1928 |
| 1,992,044 | Saxton | Feb. 19, 1935 |
| 2,105,538 | Landon | Jan. 18, 1938 |
| 2,151,778 | Landon | Mar. 28, 1939 |
| 2,208,422 | Hugon | July 16, 1940 |
| 2,231,792 | Bingley | Feb. 11, 1941 |
| 2,240,420 | Schnitzer | Apr. 29, 1941 |
| 2,241,553 | Kallmann | May 13, 1941 |
| 2,269,001 | Blumlein | Jan. 6, 1942 |
| 2,286,450 | White et al. | June 16, 1942 |
| 2,294,341 | Moore | Aug. 25, 1942 |
| 2,304,713 | Smith | Dec. 8, 1942 |
| 2,323,598 | Hathaway | July 6, 1943 |
| 2,332,681 | Wendt | Oct. 26, 1943 |
| 2,356,141 | Applegarth | Aug. 22, 1944 |
| 2,363,813 | Somers | Nov. 28, 1944 |
| 2,476,523 | Wright | July 19, 1949 |
| 2,616,964 | Cohen | Nov. 4, 1952 |
| 2,632,049 | Druz | Mar. 17, 1953 |

FOREIGN PATENTS

| Number | Country | Date |
|---|---|---|
| 366,096 | Italy | Dec. 13, 1938 |